United States Patent
Kreienbaum

[11] 3,722,802
[45] Mar. 27, 1973

[54] AGRICULTURAL SPREADERS

[75] Inventor: Hubert Kreienbaum, Stadtlohn, Germany

[73] Assignee: Wilhelm Kemper KG, Stadtlohn, Germany

[22] Filed: Feb. 19, 1971

[21] Appl. No.: 116,941

[30] Foreign Application Priority Data

Feb. 20, 1970 Germany.....................P 20 07 871.1
Apr. 22, 1970 Germany.....................P 20 19 273.8

[52] U.S. Cl......................................239/658, 56/294
[51] Int. Cl..............................................A01c 3/06
[58] Field of Search.....239/667, 658; 172/45; 56/24, 56/29, 294

[56] References Cited

UNITED STATES PATENTS

| | | |
|---|---|---|
| 3,241,841 | 3/1966 | Kucera..................................239/658 |
| 3,076,654 | 2/1963 | Colwill et al. .........................239/658 |
| 3,195,899 | 7/1965 | Neuenschwander.............239/658 X |
| 3,025,067 | 3/1962 | Raney et al............................239/658 |
| 3,043,080 | 7/1962 | Mott......................................56/294 |

FOREIGN PATENTS OR APPLICATIONS 1,058,295   2/1967   Great Britain........................239/658

Primary Examiner—M. Henson Wood, Jr.
Assistant Examiner—Michael Mar
Attorney—Arthur O. Klein

[57] ABSTRACT

An implement for spreading manure, hay, straw, and the like; it comprises a cylindrical carrier body or drum to which there are pivoted tines which swing freely on axes at an angle to the direction of the cylindrical axis of the carrier drum and about which the carrier drum is rotatably driven. Material picked up by the tines, from a load to be spread, on rotation of the carrier drum, is propelled both outwardly and axially of the carrier drum.

10 Claims, 9 Drawing Figures

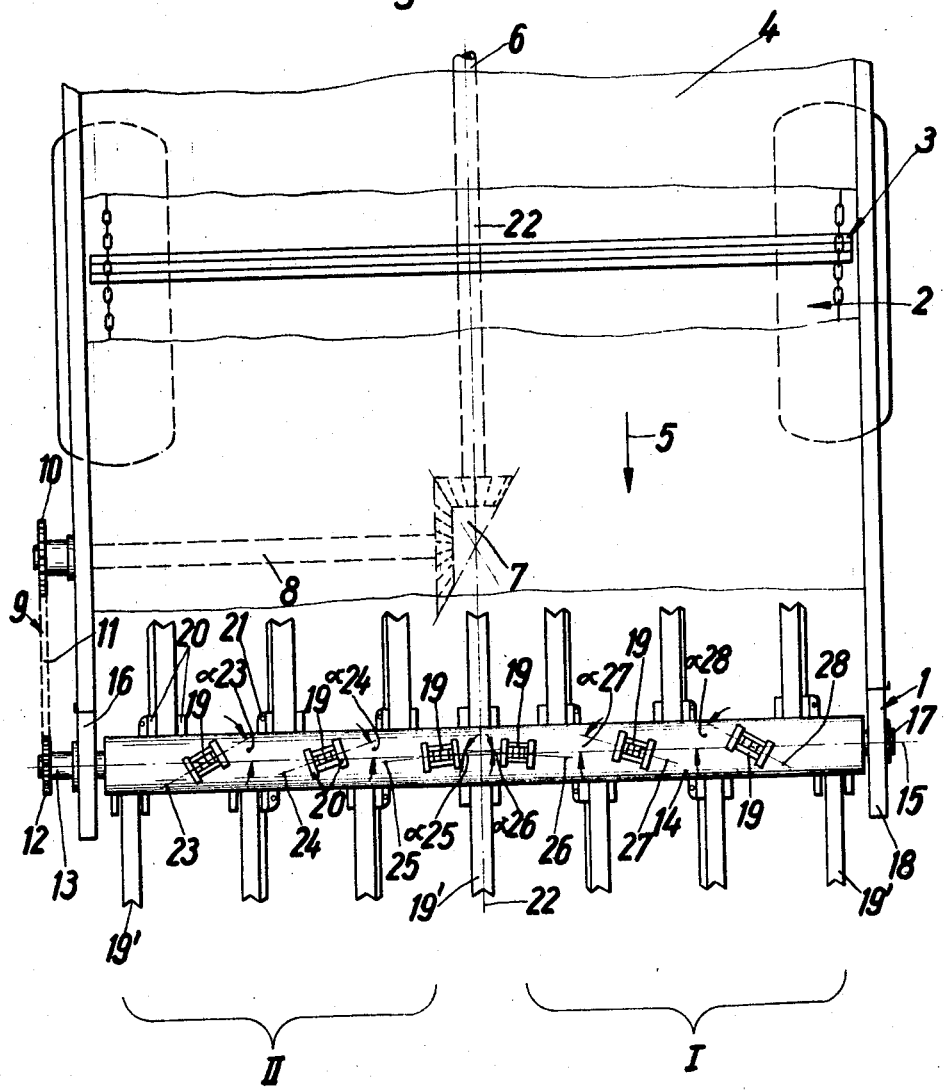

Patented March 27, 1973
3,722,802

Inventor:
Hubert KREIENBAUM by: Arthur O. Klein
Attorney

Patented March 27, 1973

Inventor:
Hubert KREIENBAUM by: Arthur O. Klein
Attorney:

Inventor:
Hubert KREIENBAUM by: Arthur O. Klein
Attorney

AGRICULTURAL SPREADERS

The present invention relates to an implement for spreading manure, hay, straw, or other spreadable bulk materials. Implements of this kind have a driven, rotating carrier body or drum for a number of spreader tools, and find application as accessory implements on agricultural vehicles of the wheeled or tracked type or, for that matter, as component parts of such vehicles.

In the past, numerous designs have been proposed which have been concerned with the problem of achieving proper spreading of material, in particular from the point of view of achieving a satisfactory width of spread. For example, it has been proposed that the axis of rotation of the tool carrier be disposed vertically and that several tool carriers plus tools be combined in one spreader implement, in order to achieve the desired width of spread. Equally, it is known to arrange one or more tool carriers with their associated tools, in a horizontal attitude, the axes of rotation being disposed in an open obtuse angle considered in the direction of travel of the vehicle, in order once again to secure the widest possible spread. Implements of this kind, however, are generally complex in structure and despite their high cost of construction do not yield satisfactory results.

In another known implement, a cylinder-type carrier is provided for a plurality of tools, the planes of rotation of the spreader tools executing a controlled oscillating or pivoting motion within a predetermined angular range about an axis which intersects the axis of rotation of the carrier. The spreader tools are, in this case, formed as rigid rings of tines and are subdivided into two groups, each of which is assigned a particular spreading range. This known implement was the first to solve the problem of achieving a wide spreading range with a good spreading pattern; its cost of construction, however, is fairly high.

Finally, in the field of muck-spreading, there is an implement in which the spreader tools consist of beaters which are articulated freely by means of ties or straps to the periphery of a cylindrical carrier. The axes of articulation of the spreader tools are disposed parallel to the axis of rotation of the carrier so that the tools circulate round the carrier axis in parallel radial planes. In this implement, spreading of the material can only properly take place over a width corresponding substantially to the width of the spreader assembly. This design has consequently found little acceptance in practice. The same applies to a modified embodiment in which the axes of articulation of the spreader tools are disposed at an angle to the axis of rotation of the carrier, and can execute a movement between a pivoted back position in which the tool tips lag behind the carrier, and the radial centrifugal position limited by stops.

In the course of a forward pivoting motion, preferably reinforced by spring action and initiated by centrifugal force, the spreader tools describe an axial movement. In one arrangement based on the lines of this embodiment, the desired large width of spread cannot be achieved; instead, in addition to high manufacturing costs, loud knocking noises and heavy wear occur, and breakdowns are inevitable as a consequence of failures of material.

The object of the present invention is to create a spreader implement which, at a moderate constructional cost, achieves effective wide range spreading with a good spread pattern, i.e. acceptably uniform spreading of the material on the surface in question.

To this end, the present invention provides an agricultural implement for spreading manure, hay, straw, or other spreadable bulk materials comprising at least one shaft, drum, or similar carrier adapted to be positioned and driven so as to rotate about a horizontal carrier axis and a plurality of spreader tines or similar tools articulated thereto such that their joint axes circulate around the carrier axis in spatial relation thereto, said joint axes being disposed at an angle to the carrier axis, wherein the spreader tools are articulatingly attached for free pivoting in the range either side of a radial position established under centrifugal force, and have their pivotal axes so disposed vis-a-vis the axis of rotation of the carrier that over at least part of the central angular range of their pivoting motion, they describe an axial movement relative to the carrier with an outward directed component. For handling manure, the spreader tools will preferentially have their axes of pivot so aligned that their axial movement with the outward-directed component occurs during the back-swing phase.

In accordance with a feature of the invention, the spreader tools can be split in a conventional way, into two groups, the axes of pivot of the tools of one group being mirror-symmetrically disposed in relation to those of the second group considered vis-a-vis an imaginary median plane perpendicularly intersecting the axis of rotation of the carrier. In this context, in an implement design intended for manure spreading (muck-spreading), the axes of pivot of the spreader tools within both groups can in each case when viewed in plan, make an angle with the axis of rotation of the carrier which is open towards the vertical median plane.

A spreader implement in accordance with the invention is simple in construction and exhibits low wear and correspondingly long operating life; it resolves the problem of achieving wide and/or long-distance spreading while securing a spreading pattern which leaves nothing to be desired so far as uniformity is concerned. Not only is the spreader largely invulnerable to stones or similar solids contained in the material being spread, but it does not involve any peak loads during start-up, and operates with considerably lower power during continuous operation. Because it is only when a certain speed on the part of the carrier is exceeded that the spreader tools become operative, and hang freely downwards when the carrier is stopped, there is no danger to be feared during pure transportation of the spreader from one place to another or during maneuvering operations.

The simplicity of the implement means that little or no maintenance is required. If, however, a worn or possibly damaged spreader tool does have to be exchanged, then a replacement can very rapidly be carried out by the user on the spot.

Specific embodiments of the present invention will now be described by way of example with reference to the accompanying drawings in which:

FIG. 1 is a schematic plan view of the tail portion of an agricultural vehicle with a spreader implement in accordance with the invention attached to its back end;

Figure 3:
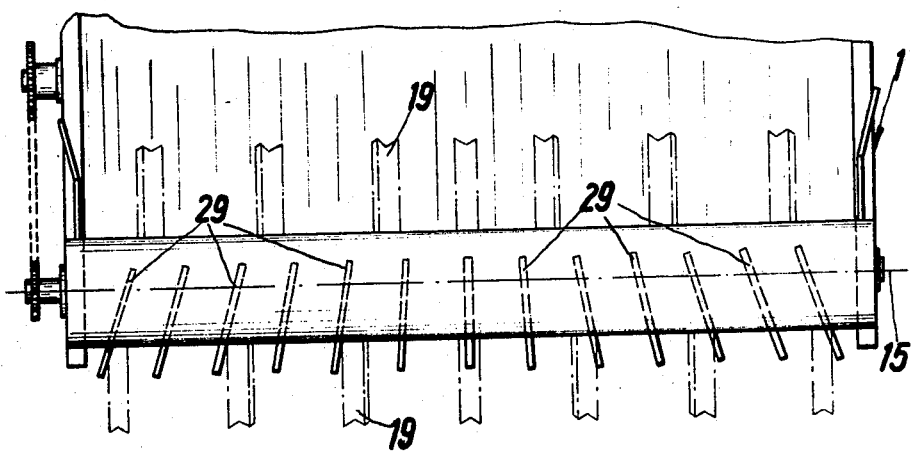
FIG. 3 is a partial plan view of FIG. 1.
Figure 2:
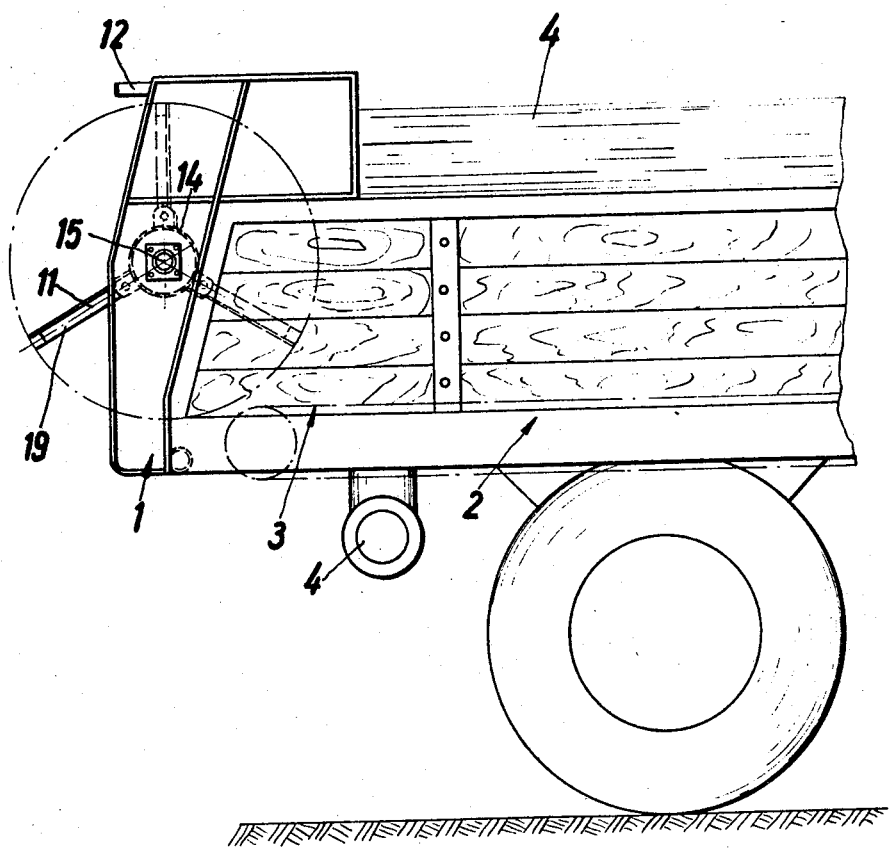
FIG. 2 is a side elevation of FIG. 1.

In the accompanying drawings the same reference characters refer to the same parts throughout the several views. In the embodiment of FIGS. 1–3, inclusive, as in the other embodiments, the spreader implement 1 constitutes a unit which is detachably fitted to the back of an agricultural vehicle 2. The load bearing surface or deck of the agricultural vehicle 2 is fitted with any known or convenient kind of roller or scraper flight or conveyor 3 by means of which material 4 which is to be spread, e.g. manure, is supplied continuously or intermittently to the spreader implement 1. The arrow 5 indicates the direction of motion of the conveyor or scraper flight over the load bearing surface or deck of the vehicle. The drive to the scraper flight or scraper conveyor is derived, in a manner which is not shown in detail, from a drive shaft 6 which can be coupled in a conventional way through a power take-off shaft or articulated propeller shaft to the drive of a tractor or similar tractor vehicle used to draw the vehicle 2 (trailer, semitrailer, etc.). To a bevel gear arrangement 7, an intermediate shaft 8 and a chain drive 9, a drive for the spreader implement 1 is taken from the shaft 6. The chain drive 9 comprises in detail a sprocket 10 attached to the intermediate shaft 8, a chain 11 and a further sprocket 12 which is attached to a shaft stop 13 associated with a cylinder type tool carrier 14, causing the latter to rotate about its axis 15. The shaft stop 13 passes through a sidewall 16 of the implement and is rotatably mounted therein. At its opposite end, a corresponding shaft stop 17 passes through a corresponding implement sidewall 18 provided there and is likewise rotatably mounted in such sidewall. The shaft stops 13, 17 can be welded onto the ends of the carrier 14, or can form part of a through-shaft to which the cylinder of the carrier 14 is attached.

Articulatingly fixed to the external periphery of the carrier 14 are spreader tools 19. The spreader tools 19 consist, in the example of FIGS. 1–3, of tines of straight L-section or U-section which contain V-shaped notches at their outward ends in order to form pairs of tine tips.

The attachment of the spreader tools 19 to the carrier 14 is effected with the help of straps or ties 20 which are, for example, welded to the carrier 14. These straps or ties support a joint pin 21 which extends through an eye or suitable holes in the spreader tools 19.

The spreader tools 19 can execute a free oscillatory motion about their joint pins 21, such motion being limited at either side exclusively by the carriage itself, and accordingly has a theoretical total angular sweep in excess of 180°. As the carrier 14 rotates, the spreader tools 19 tend to adopt a radial attitude under the effect of the centrifugal force whereas under the effect of gravity, with the carrier 14 stationary, they hang freely down. In the drawings, the spreader tools 19 have through-out been illustrated in the radial position towards which they tend while the carrier 14 is rotating.

The spreader tools 19, which are arranged in staggered fashion on the carrier 14, are deployed in two groups I and II of which, considering FIG. 1, the group I is to the right and the group II to the left, of a vertical median plane 22 intersecting the axis of rotation of the carrier 14 at right angles.

As FIG. 1 shows in more detail, the joint axes of the spreader tools are disposed at an angle to the axis of rotation 15 of the carrier 14. This angled disposition of the joint axes is shown in FIG. 1 in the case of the top (plan view) spreader tools 19, where the joint axes are marked 23, 24, 25, and 26, 27, 28. The angles of these axes with the axis of rotation 15 and of the carrier 14 are correspondingly marked $\alpha_{23}$ to $\alpha_{28}$. As FIG. 1 shows, the joint axes 23, 24, and 25 of the spreader tools in group II are disposed mirror-symmetrically vis-a-vis those 26, 27, 28 of the spreader tools in group I, considered in relation to the median plane 22. The angles $\alpha$ between the axes of the spreader tools and the axis 15 of the carrier, become progressively larger, within both tool groups, commencing from the median plane 22 towards the ends of the carrier 14. In the example of FIG. 1, the joint axes 23, 24, 25 and 26, 27, 28 of the spreader tools intersect the axis 15 of rotation of the carrier 14 simply in a spatial sense and, in so doing, within the two tool groups and viewed in plan, in each case subtend at the axis 15 of the carrier 14 angles which are open towards the vertical median plane 22. In order fully to define the spatial position of the joint axes 23-28 and, accordingly, the other joint axes of the remaining spreader tools 19, it should also be pointed out that the pivot pins 21 defining said joint axes describe a cylindrical surface in rotating about the axis 15 of the carrier 14.

In operation of the spreader implement, as the carrier 14 speeds up and the centrifugal force thus increases, the spreader tools move from a pendant position to their radial position, reaching the latter at a specific minimum speed. If the drive to the scraper flight 3 is now operated and the mass of material which is to be spread, e.g. the manure 4, is applied to the spreader implement 1 in the direction of the arrow 5, then the spreader tools 19 come into engagement with said material during a certain proportion of their full circumferential motion. Through engagement with the material, they are deflected from their extended radial attitude, oppositely to the direction of rotation of the carrier 14, the angle of deflection depending upon the resistance which the material offers to the tools 19. As a consequence of this deflection, in which the tips of the spreader tools 19 lag, in each case vis-a-vis their associated joint axes, the tools 19, by virtue of the angled disposition of their joint axes vis-a-vis the axis of rotation 15 of the carrier, execute an axial motion i.e., considering group I of FIG. 1, they displace towards the right and considering group II, towards the left. On engagement with the mass of material 4, the spreader tools pick up and carry out a small quantity from the main mass and carry this along with them. As soon as the spreader tools 19 have passed through the range of engagement with the main mass of material 4, they tend once again to assume their radial position under the effect of centrifugal force, once again undergoing an axial displacement as they do so and swinging beyond the radial position into a position in which their tips lead the carrier 14, and then swinging back again. Continuation of the free swing towards the radial position is interrupted by renewed engagement with the main mass of material being spread. At the same time, the spreader tools 19 sling away the quantity of material which they have picked up and carried around with them.

Because of their axial displacement during a pivoting or swinging movement about their joint axes in so doing, the spreader tools impart to the material they have entrained an ejecting motion which has an axial component directed towards the ends of the carrier 14, said axial component being the greater the larger the angle $\alpha$ between the joint axes and the axis of rotation of the carrier. Accordingly the ejected particles of material fly in an upward and sideways arc in relation to the direction of motion of the vehicle 2. By this means widths of spread can readily be achieved which are twice the axial length of the carrier 14 and more. In the case of manure, too, it has surprisingly been found that the axial ejection component in the spread material, this component always being outward-directed within the groups, is achieved with an angular disposition of the joint axes 23 – 28 of the kind schematically illustrated in FIG. 1 in respect to the top row of spreader tools 19. With this angular setting, the spreader tools 19, when performing the back-swing motion, have an axial motion with an outward-directed component.

By off-setting the spreader tools 19, i.e. by rotating the tip zone of the tools vis-a-vis their base zone, the tools can be arranged to have a different angle of incidence on the part of their working faces over the range in which they are in engagement with the material being spread. Particularly good results have been obtained with a tool off-set in which the working faces of the tools 19 in each case have an angle of incidence such as to create a component towards the ends of the carrier 14.

As FIG. 1 shows in more detail, in addition to the spreader tools 19 with their angled joint axes, it is possible to provide additional spreader tools 19' in the neighborhood of the end of the carrier and in the neighborhood of the carrier's center. The joint axes of tools 19', as illustrated, are disposed in the conventional way parallel to the axis of rotation 15 of the carrier 14. These additional spreader tools 19' serve to prevent the development of areas on the mass of material being spread which are not covered by the other spreader tools 19.

As FIG. 3 shows in more detail, above the range of operation of the spreader tools 19 a guide grid 29 can be arranged whose guide bars, plates or the like are aligned in a direction substantially corresponding with the desired direction of spread. Using this guide grid, the particles of material which are ejected can be given an additional increased axial component.

Figure 4:
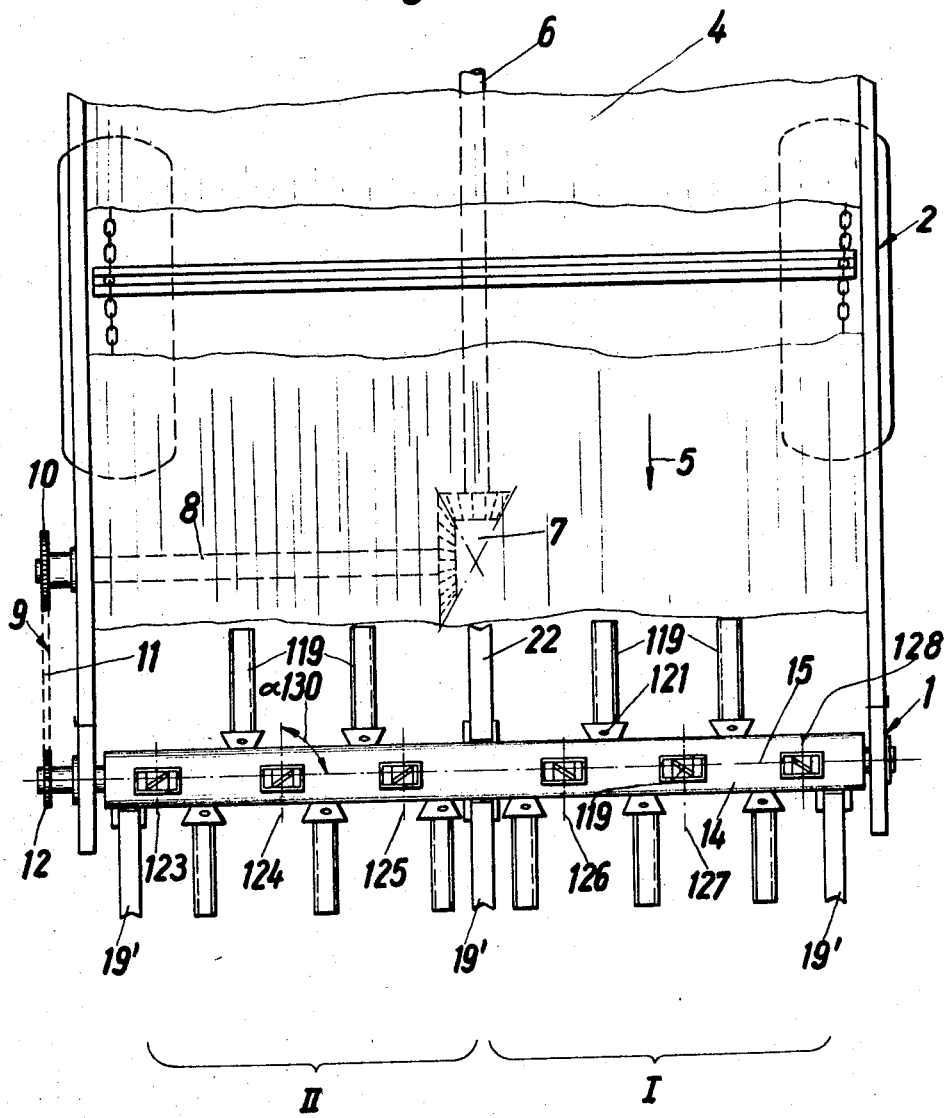
FIG. 4 is a plan view similar to FIG. 1, showing a second embodiment of spreader implement in accordance with the invention.
Figure 5:
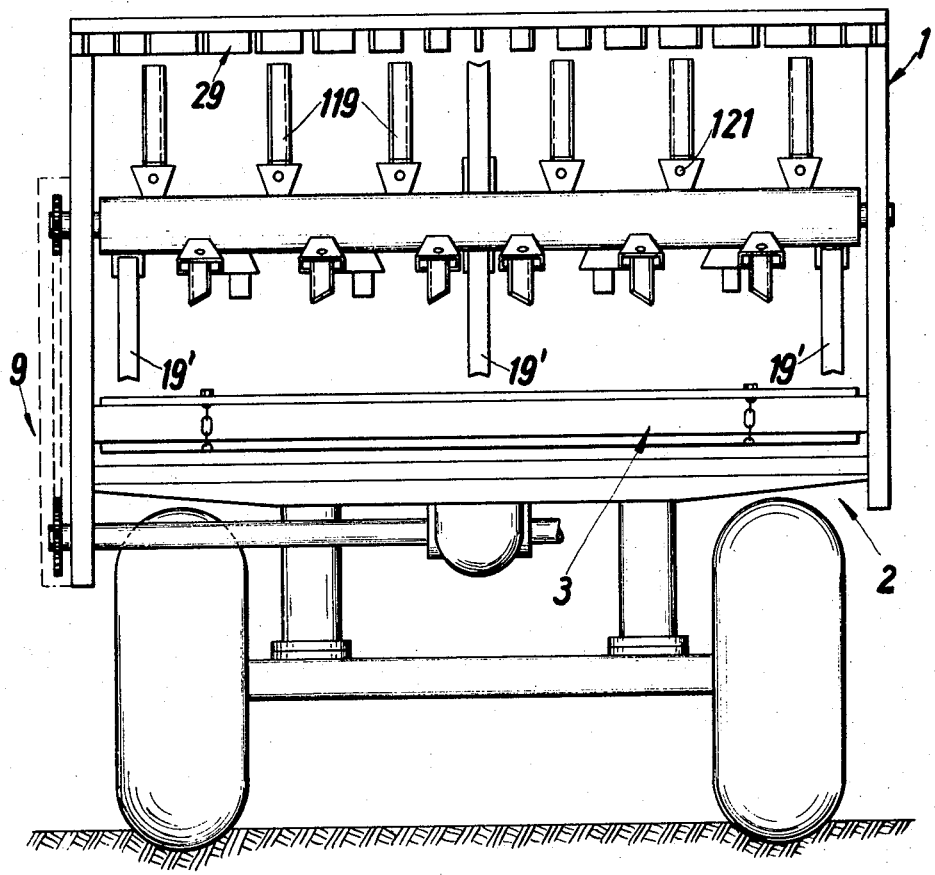
FIG. 5 is a rear elevation of FIG. 4.

The second illustrative embodiment of spreader implement, illustrated in more detail in FIGS. 4 and 5, largely corresponds with that of FIGS. 1 – 3. Components which are the same or similar, are therefore designated by the same reference characters. In departure from the preferred embodiment of FIGS. 1 – 3, however, in the embodiment of FIGS. 4 and 5 the spreader tools 119 are attached to the carrier 14 through joint pins 121 and the associated ties and straps, all of which define spatial joint axes 124 and 128 which intersect the axis of rotation 15 of the carrier 14 at right angles. This is illustrated by the angle $\alpha_{130}$ in the drawing. As FIGS. 4 and 5 illustrate in more detail, the spreader tools 119 are off-set, and in the example shown have an ejection phase or, in other words, the phase which comes into engagement with the material being spread, which is disposed towards the center of the carrier. As the carrier 14 rotates, the spreader tools 119 again initially align themselves in a radial direction and during engagement with the material 4 being spread experience a displacement in the axial direction although there is no lead or lag between the tips of the spreader tools and their base regions. When the spreader tools 19 come out of engagement with the mass of material from which spreading is being effected, they once again tend to swing back to their extended radial position and in the course of an axial swinging motion swing off the parts of material they have entrained.

In the example illustrated, the theoretical direction of ejection of the particles of material which are flung off, has an axial component directed towards the center of the carrier. This may be desirable, depending upon the nature of the material being spread, in order to concentrate the spread over a narrow strip. In other cases, or when using other kinds of materials which tend for example to cling to the spreader tools, it is possible, despite the angle of incidence of the ejection faces of the spreader tools, for spreading over a wide range to take place, which is surprising. By reversing the incidence produced by off-setting the tines, a corresponding reversal in the direction of the axial component can be produced. It should also be pointed out that the angles of incidence of the ejection surfaces of the spreader tines 119 can progressively increase, commencing from the vertical median plane 22 towards the ends of the carrier 14, from tool to tool.

Figure 6:
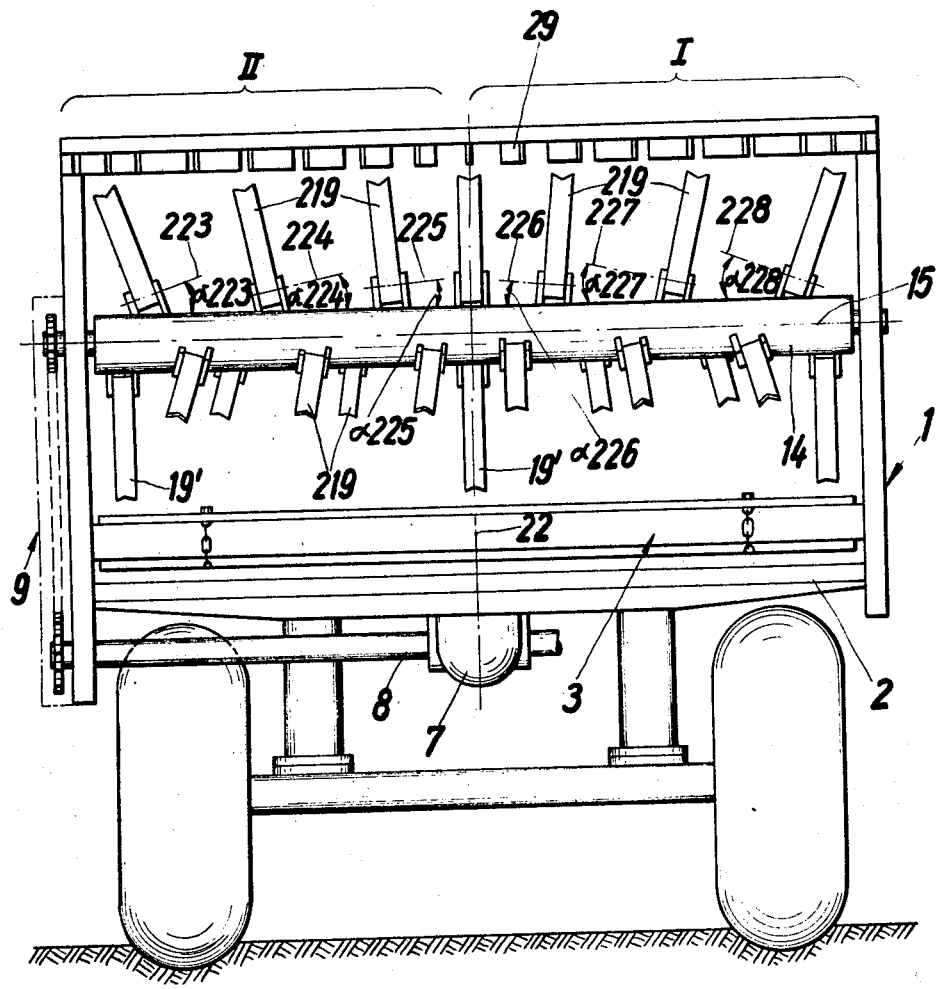
FIG. 6 is an elevation similar to FIG. 5, of a third embodiment of spreader implement in accordance with the invention.
Figure 7:
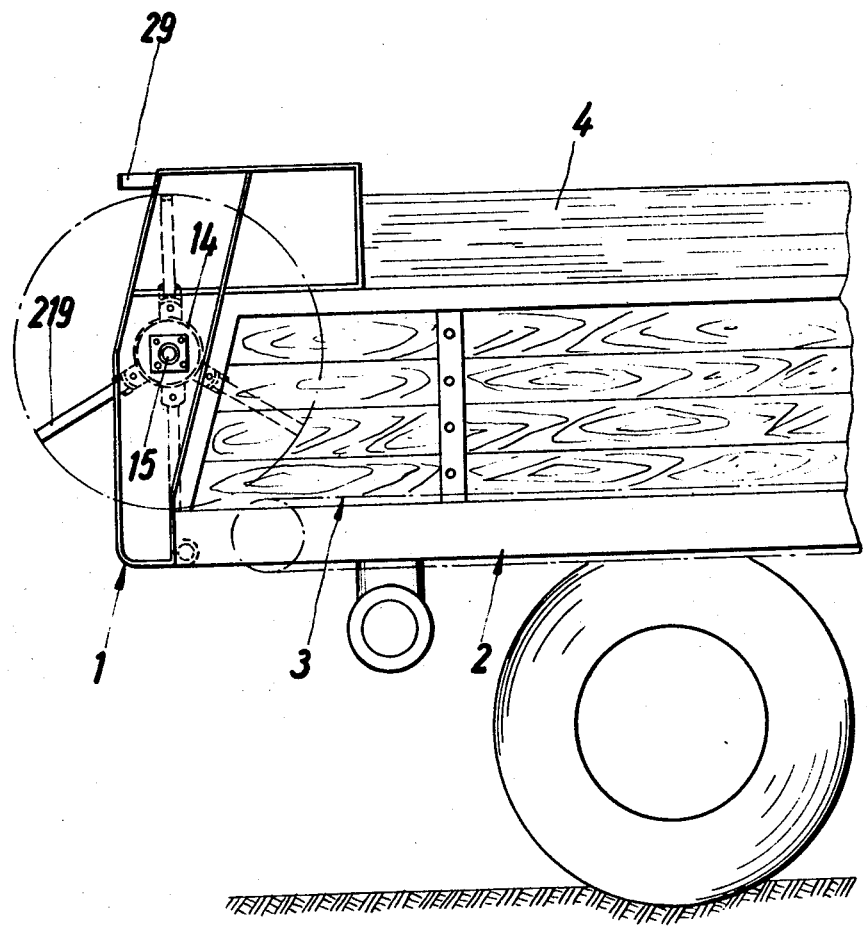
FIG. 7 is a side elevation of FIG. 6.

In the third embodiment, illustrated in FIGS. 6 and 7, the joint axes 223 and 228 of the spreader tools 219 intersect the axis of rotation 15 of the carrier 14, not in a spatial manner, but are instead located in an axial plane passing through the axis of rotation of the carrier and make acute angles $\alpha_{223}$ to $\alpha_{228}$ with the axis of rotation 15, as indicated in the case of the series of spreader tools shown at the peak of their motion in FIG. 6. In this series of spreader tools, the joint axes 223 to 228 are accordingly located in the plane of the drawing. The angles $\alpha_{223}$ to $\alpha_{228}$ of the spreader tools in group II and likewise the corresponding angles $\alpha_{226}$ to $\alpha_{228}$ of group I, differ by progressive increments.

Figure 8:
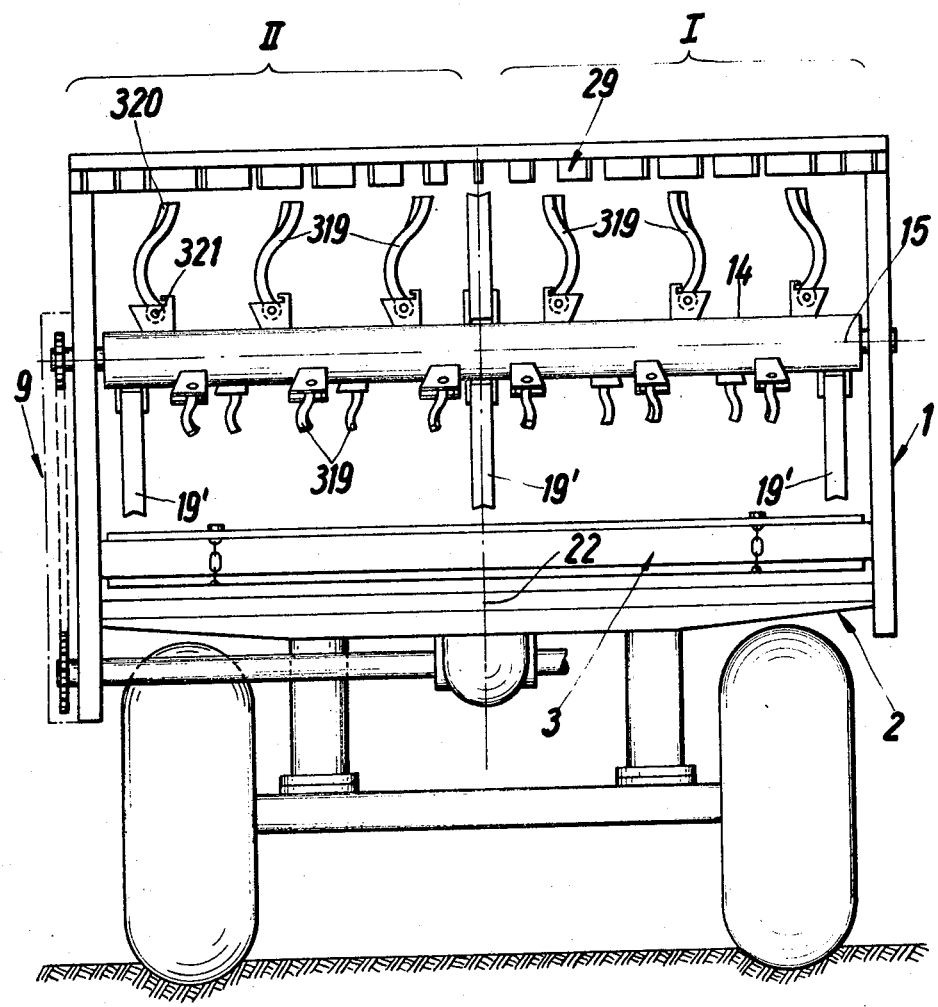
FIGS. 8 and 9 are views similar to FIGS. 6 and 7, respectively, of a fourth embodiment of spreader implement in accordance with the invention.
Figure 9:
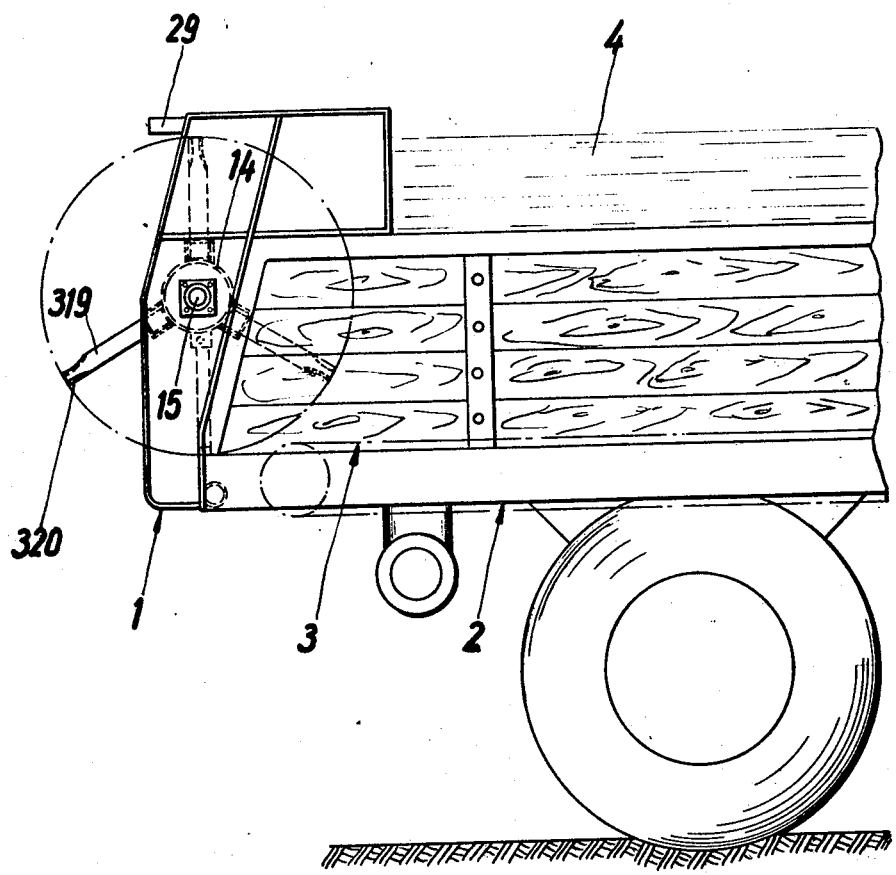

When, as a consequence of engagement with the material 4 being spread, the spreader tools 219 experience a deflection from their extended radial attitude, the tips of the tines are displaced axially by an amount determined by the angular disposition of the joint axes, while once again the tips are transferred to a lagging position in relation to their particular base zones. In this design, too, the spreader tools, when they swing about their joint axes, impart to the material being spread a direction of ejection which is towards the rear with an axial, that is to say, sideways-directed component. The fourth embodiment, illustrated in FIGS. 8 and 9, is similar to that of FIGS. 4 and 5. All the joint pins 321, defining the joint axes of the spreader tools 319, spatially intersect the axis of rotation 15 of the carrier 14 at right angles. The spreader tools 319, themselves, however, are cranked in the axial direction, in order to off-set the center of gravity of the tines, and in the neighborhood of their external ends exhibit an angled working face 320 in each case; face 320 means that when in engagement with the material 4 being spread, the tools 319 undergo a deflection axially towards the center of the carrier. Once released from the material 4, the tools 319 accordingly execute a return motion in the course of which they eject the particles of material they have picked up, with an axial, that is, laterally-directed component.

Numerous modifications of the examples illustrated and described are possible. For example, additional weights may be fitted to the spreader tools in order to displace their center of gravity, e.g. to shift them further outwards and thus to improve the effect of centrifugal force at a given carrier speed. This may, in particular, be an advantage when handling tough and heavy material. Furthermore, it is conceivable that each carrier could be fitted not, as illustrated, with three tiers of spreader tools arranged around its periphery, but instead with simply two diametrally opposite series or for that matter with more than three. In all cases, however, it is advantageous to give the spreader tools an axial off-set in order to exclude any possibility of interference between them during operation. Instead of arranging the spreader tools in the form of rows off-set around the circumference, another arrangement can be provided in which the spreader tools are distributed around the carrier 14 and attached thereto, along a helix.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

What is claimed is:

1. An agricultural implement for spreading manure, hay, straw, or other spreadable bulk materials, comprising at least one carrier adapted to be positioned and driven so as to rotate about a horizontal carrier axis, a plurality of spreader tines articulated to the carrier so that their joint axes circulate around the carrier axis in spatial relation thereto, said joint axes being disposed at an angle to the carrier axis, the spreader tools being articulatingly attached for free pivoting in a range extending on either side of a radial position established under centrifugal force, the pivotal axes being so disposed vis-a-vis the axis of rotation of the carrier that over at least part of the central angular range of the pivoting motion they describe, their pivoting motion has an outward-directed axial movement component relative to the axis of the carrier.

2. An implement as claimed in claim 1, wherein the spreader tools have their pivot axes so aligned that when they swing backwards they have an axial motion with an outward-directed component relative to the carrier.

3. An implement as claimed in claim 1, wherein the joint axes of the spreader tools are located in an axial plane passing through the axis of rotation of the carrier and form an acute angle with respect to the axis of rotation.

4. An implement as claimed in claim 1, wherein the spreader tools are split into two groups and the joint axes of the tools of one group are disposed mirror-symmetrically to those of the second group considered in relation to an imaginary median plane intersecting the axis of rotation of the carrier at right angles.

5. An implement as claimed in claim 4, wherein the joint axes of the spreader tools in the two tool groups, when considered in plan, in each case form with the axis of rotation of the carrier, angles which are open towards said vertical median plane.

6. An implement as claimed in claim 4, wherein the joint axes of the spreader tools within the two groups considered in plan in each case form with respect to the axis of rotation of carrier angles which are open to both ends of said carrier.

7. An implement as claimed in claim 1, wherein the angles between the joint axes of the tools and the axis of rotation of the carrier, increase progressively from tool to tool, working from the median plane towards the end of the carrier.

8. An implement as claimed in claim 1, wherein the spreader tools themselves are twisted in order to form an inclined ejection face relative to the axis of the carrier which has an axial component.

9. An implement as claimed in claim 1, wherein the joint axes of at least some of the spreader tools are disposed at right angles to the axes of rotation of the carrier, and said spreader tools have an obliquely disposed face at least in their tip regions.

10. An implement as claimed in claim 1, comprising a guide grid arranged above the range of operation of the spreader tools, said grid having guide elements aligned in a direction substantially corresponding with the direction in which the material is to be spread.

* * * * *